(12) United States Patent
Liu et al.

(10) Patent No.: US 12,306,419 B2
(45) Date of Patent: May 20, 2025

(54) OPTICAL FILM

(71) Applicant: 3M INNOVATIVE PROPERTIES COMPANY, St. Paul, MN (US)

(72) Inventors: Tao Liu, Woodbury, MN (US); Gary T. Boyd, Woodbury, MN (US); Daniel J. Schmidt, Woodbury, MN (US); Caleb T. Nelson, McKinney, TX (US); Owen M. Anderson, Minneapolis, MN (US); Tri D. Pham, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 206 days.

(21) Appl. No.: 17/769,280

(22) PCT Filed: Oct. 29, 2020

(86) PCT No.: PCT/IB2020/060184
§ 371 (c)(1),
(2) Date: Apr. 14, 2022

(87) PCT Pub. No.: WO2021/090130
PCT Pub. Date: May 14, 2021

(65) Prior Publication Data
US 2024/0142673 A1    May 2, 2024

Related U.S. Application Data

(60) Provisional application No. 62/932,578, filed on Nov. 8, 2019.

(51) Int. Cl.
*G02B 3/08*  (2006.01)
*G02B 1/10*  (2015.01)

(52) U.S. Cl.
CPC  *G02B 3/08* (2013.01); *G02B 1/10* (2013.01)

(58) Field of Classification Search
CPC ....... G02B 3/08; G02B 1/10; G02B 2207/123
See application file for complete search history.

(56) References Cited

U.S. PATENT DOCUMENTS

| | | |
|---|---|---|
| 3,712,707 A | 1/1973 | Henkes, Jr. |
| 5,175,030 A | 12/1992 | Lu et al. |

(Continued)

FOREIGN PATENT DOCUMENTS

| | | |
|---|---|---|
| EP | 3550360 B1 | 2/2022 |
| JP | 2005111839 A | 4/2005 |

(Continued)

OTHER PUBLICATIONS

International Search Report for PCT/IB2020/060184 mailed on Jan. 19, 2021, 4 pages.

(Continued)

*Primary Examiner* — Wyatt A Stoffa
*Assistant Examiner* — Mitchell T Oestreich
(74) *Attorney, Agent, or Firm* — Clifton F. Richardson

(57) ABSTRACT

An optical film has a major surface including a plurality of microstructures. Each microstructure includes an optical facet and a sidewall meeting the optical facet at a ridge of the microstructure. The optical facet and the sidewall define an oblique angle therebetween. For each microstructure in at least a majority of the microstructures, an optically absorptive layer is disposed on the sidewall. The optical film can include a polymeric layer having a microstructured surface at least partially coated with an inorganic optically transparent layer. The optically absorptive layer can an average thickness t where 100 nm<t<1 micrometer. A first layer can be disposed between the sidewall and the optically absorptive layer where the first layer has a lower extinction coefficient than the optically absorptive layer.

11 Claims, 11 Drawing Sheets

(56) References Cited

U.S. PATENT DOCUMENTS

| | | |
|---|---|---|
| 5,183,597 A | 2/1993 | Lu |
| 5,997,709 A | 12/1999 | Krinke |
| 6,649,328 B2 | 11/2003 | Ono et al. |
| 6,696,157 B1 | 2/2004 | David et al. |
| 7,701,648 B2 | 4/2010 | Amano et al. |
| 8,234,998 B2 | 8/2012 | Krogman et al. |
| 8,313,798 B2 | 11/2012 | Nogueira et al. |
| 8,460,568 B2 | 6/2013 | David et al. |
| 8,664,323 B2 | 3/2014 | Iyer et al. |
| 9,919,330 B2 | 3/2018 | Letard et al. |
| 10,365,415 B2 | 7/2019 | Schmidt |
| 2003/0112515 A1 | 6/2003 | Nakabayashi |
| 2006/0114569 A1 | 6/2006 | Capaldo et al. |
| 2010/0302654 A1 | 12/2010 | Amano et al. |
| 2011/0064936 A1 | 3/2011 | Cunningham et al. |
| 2011/0304916 A1 * | 12/2011 | Ushigome .......... G02B 27/4272 359/576 |
| 2011/0304917 A1 | 12/2011 | Ushigome |
| 2012/0204566 A1 | 8/2012 | Hartzell et al. |
| 2013/0229378 A1 | 9/2013 | Iyer et al. |
| 2013/0273242 A1 | 10/2013 | Krogman et al. |
| 2020/0012017 A1 | 1/2020 | Shimoda |

FOREIGN PATENT DOCUMENTS

| | | |
|---|---|---|
| JP | 2011257662 A | 12/2011 |
| JP | 2013218073 A | 10/2013 |
| JP | 2014157247 A | 8/2014 |
| WO | 2018168326 A1 | 9/2018 |
| WO | 2019118685 A1 | 6/2019 |
| WO | 2020250180 A1 | 12/2020 |
| WO | 2021090207 A1 | 5/2021 |

OTHER PUBLICATIONS

Krogman, "Automated Process for Improved Uniformity and Versatility of Layer-by-Layer Deposition", Langmuir, Mar. 13, 2007, vol. 23, No. 6, pp. 3137-3141.

Mohon et al., Fresnel Lens in an Improved Infinity Image Display System, U.S. Statutory Invention Registration H423, Feb. 2, 1988, 5 pages.

* cited by examiner

OPTICAL FILM

CROSS REFERENCE TO RELATED APPLICATIONS

This application is a national stage filing under 35 U.S.C. 371 of PCT/IB2020/060184, filed Oct. 29, 2020, which claims the benefit of Provisional Application No. 62/932,578, filed Nov. 8, 2019, the disclosures of which are incorporated by reference in their entirety herein.

BACKGROUND

A Fresnel lens can include a plurality of facets for focusing light.

SUMMARY

In some aspects, the present disclosure provides an optical film having a major surface including a plurality of microstructures. Each microstructure includes an optical facet and a sidewall meeting the optical facet at a ridge of the microstructure. The optical facet and the sidewall define an oblique angle therebetween. For each microstructure in at least a majority of the microstructures, an optically absorptive layer is disposed on the sidewall. The optical film can include a polymeric layer having a microstructured surface conformally coated, or at least partially coated, with an inorganic optically transparent layer. The optically absorptive layer can have an average thickness t where 100 nm<t<1 micrometer. A first layer can be disposed between the sidewall and the optically absorptive layer where the first layer has a lower extinction coefficient than the optically absorptive layer.

In some aspects, the present disclosure provides an optical film including a polymeric layer including a microstructured surface at least partially coated with an inorganic optically transparent layer. The at least partially coated microstructured surface includes a plurality of microstructures. Each microstructure includes an optical facet and a sidewall meeting the optical facet at a ridge of the microstructure. The optical facet and the sidewall define an oblique angle therebetween. For each microstructure in at least a majority of the microstructures, an optically absorptive layer is disposed on and substantially covers the sidewall.

In some aspects, the present disclosure provides an optical film including a polymeric layer having a microstructured surface conformally coated with an inorganic optically transparent layer. The inorganic optically transparent layer includes opposing first and second major surfaces where the second major surface faces the polymeric layer and the first major surface includes a plurality of microstructures. Each microstructure includes an optical facet and a sidewall meeting the optical facet at a ridge of the microstructure. The optical facet and the sidewall define an oblique angle therebetween. For each microstructure in at least a majority of the microstructures, an optically absorptive layer is disposed on and substantially covers the sidewall.

In some aspects, the present disclosure provides an optical film having opposing first and second major surfaces where the first major surface includes a plurality of microstructures. Each microstructure includes an optical facet and a sidewall meeting the optical facet at a ridge of the microstructure. The optical facet and the sidewall define an oblique angle therebetween. For each microstructure in at least a majority of the microstructures, an optically absorptive layer is disposed on and substantially covers the sidewall. The optically absorptive layer can have an average thickness t, where 100 nm<t<1 micrometer. For each microstructure in at least a majority of the microstructures, the optical facet can have a mean deviation surface roughness Ra less than 250 nm.

In some aspects, the present disclosure provides an optical film having opposing first and second major surfaces, the first major surface includes a plurality of microstructures. The microstructures can have an extinction coefficient k0<0.05. Each microstructure includes an optical facet and a sidewall meeting the optical facet at a ridge of the microstructure. The optical facet and the sidewall define an oblique angle therebetween. For each microstructure in at least a majority of the microstructures: a first layer is disposed on and substantially covers the sidewall, and an optically absorptive layer is disposed on the first layer opposite the sidewall. The first layer has an extinction coefficient k1 that can be greater than k0. The optically absorptive layer can substantially cover the first layer. The optically absorptive layer can have an extinction coefficient k2 where k2−k1 is greater than 0.05.

In some aspects, the present disclosure provides processes for making the optical films.

DETAILED DESCRIPTION

Figure 1:
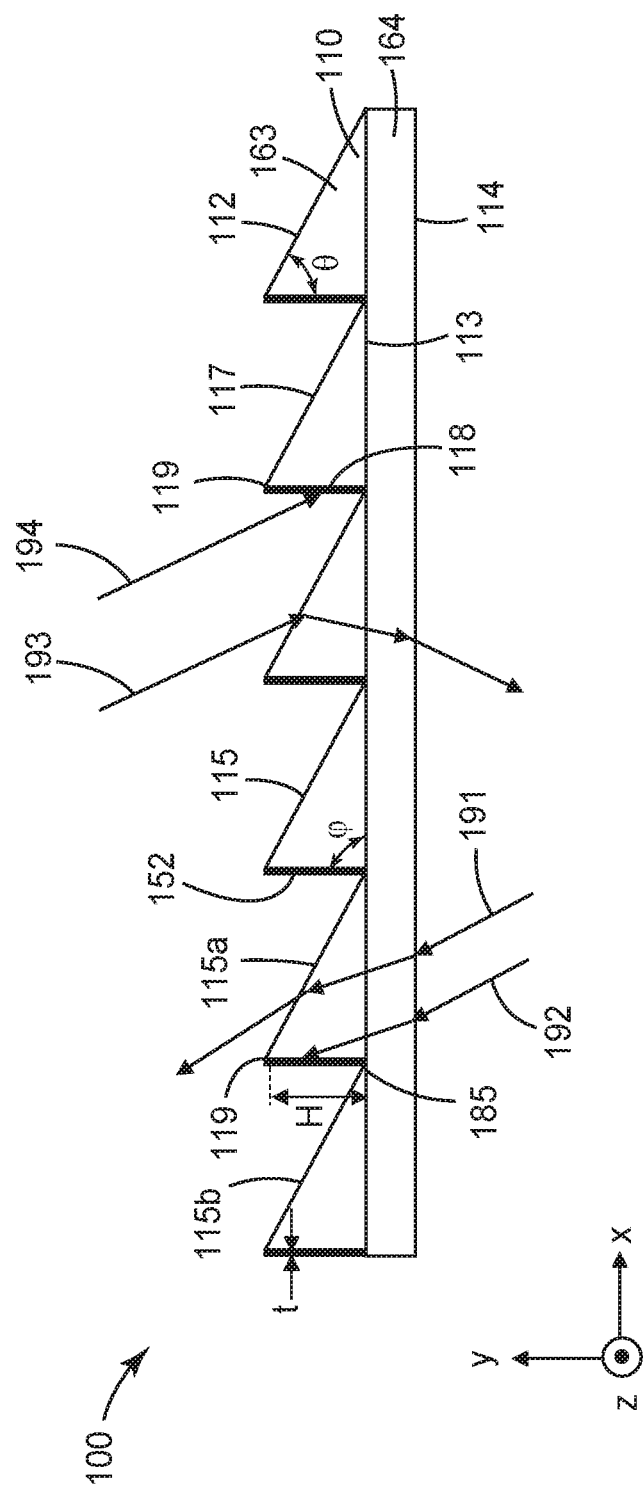
FIG. 1 is a schematic cross-sectional view of an optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, an optical film includes a structured surface that includes a plurality of microstructures (i.e., structures having at least two orthogonal dimensions, such as a width and a height, less than 1 mm and greater than 100 nm) having optical facets and sidewalls. In some cases, it is desired to include optically absorptive material on the sidewalls as this has been found to reduce undesired redirection of light caused by the sidewalls that would otherwise occur in some applications. Utilizing thin (e.g., less than 1 micrometer thick) optically absorptive layers has been found to reduce undesired effects (e.g., blocking light incident on an edge of the layer that would be desired to be transmitted) of the optically absorptive layers. When the optically absorptive layer is thin, it preferably has a relatively high extinction coefficient in order to efficiently absorb light. In some cases, the high extinction coefficient can produce a reflective, metal-like interface with the sidewall. It has been found that adding a cladding layer (e.g., a layer having an extinction coefficient less than that of the optically absorptive layer and greater than that of the sidewall material) between a high extinction coefficient absorbing layer and the sidewall can reduce reflectivity and thereby reduce undesired light redirection by the sidewalls. A thin optically absorptive layer can be formed on the sidewalls by depositing the layer over the (e.g., entire) structured surface and then removing the layer from the optical facets by selectively (e.g., anisotropically) etching the layer from the optical facets, for example. It has been found that when the etching is suitably controlled, the resulting surface roughness can be in a desired range. For example, it has been found that the surface roughness Ra for a sloped facet resulting from using etching processes known to produce low surface roughness in a horizontal facet of a louver film, for example, can be higher than 300 nm or higher than 400 nm. This degree of surface roughness is undesired in many applications. However, it has been found, according to some embodiments, that the surface roughness can be reduced to a desired range (e.g., Ra<250 nm) by controlling the etching process to limit the exposure of the optical facet to the etchant. Further, it has been found, according to some embodiments, that the surface roughness can be reduced by adding an optically transparent etch stop layer prior to adding the optically absorptive layer in order to preserve the smoothness of optical facet. For example, the resulting optical facet can be optically smooth (e.g., Ra<50 nm).

FIG. 1 is a schematic cross-sectional view of an optical film 100. The optical film 100 can include opposing first 112 and second 114 major surfaces where the first major surface 112 includes a plurality of microstructures 115. Each microstructure 115 includes an optical facet 117 and a sidewall 118 meeting the optical facet 117 at a ridge 119 of the microstructure. The optical facet 117 and the sidewall 118 define an oblique angle θ therebetween. In some embodiments, the oblique angle θ is at least 20 degrees or at least 30 degrees. In some embodiments, the oblique angle θ is no more than 80 degrees or no more than 70 degrees. For each microstructure in at least a majority of the microstructures (e.g., all of the microstructures, or all of the microstructures except those along one or more edges, or at least 80% of the microstructures), an optically absorptive layer 152 is disposed on and substantially covers the sidewall 118 (e.g., covers at least 70%, or at least 80%, or at least 90% of a total area of the sidewall 118). The optically absorptive layer 152 can be included to block light incident on the sidewall 118 that would otherwise be redirected into an undesired direction. For example, light rays 191 and 192 are incident on the second major surface 114 along a substantially same direction, and light ray 191 is refracted by an optical facet into a desired direction while light ray 192 is blocked from being redirected by a sidewall into an undesired direction. Similarly, light rays 193 and 194 are incident on the first major surface 112 along a substantially same direction, and light ray 193 is refracted by an optical facet into a desired direction while light ray 194 is blocked from being redirected by a sidewall into an undesired direction.

Figure 4:
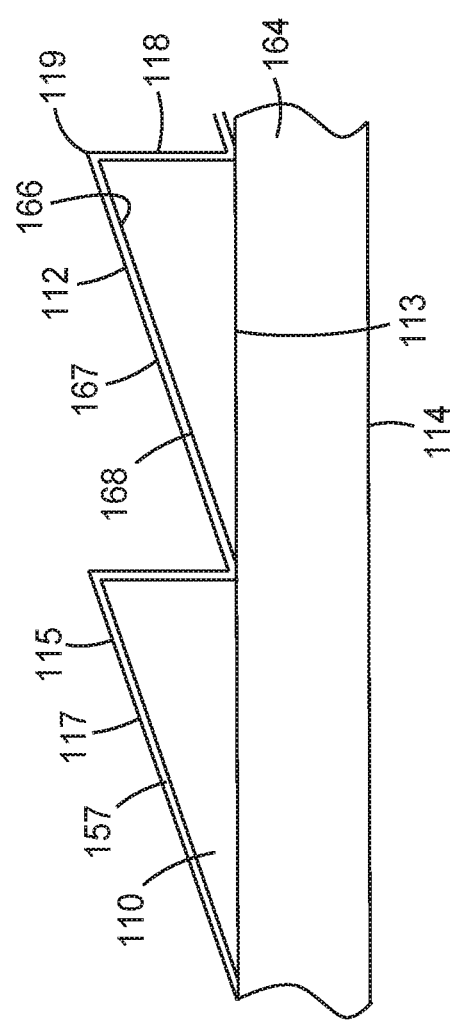

In some embodiments, the optical film 100 includes a polymeric layer 110 including a microstructured surface 168 at least partially coated (e.g., conformally coated) with an inorganic optically transparent layer 157 (see, e.g., FIG. 4). A polymeric layer is a layer including a continuous phase of organic polymer. A polymeric layer can also include inorganic nanoparticles dispersed in the continuous phase of organic polymer, for example. The inorganic optically transparent layer 157 can include opposing first 167 and second 166 major surfaces where the second major surface 166 faces the polymeric layer 110. The first major surface 167 of the inorganic optically transparent layer 157 may include at least a majority of the first major surface 112 of the optical film 100. For example, the surface 168 of the polymeric layer 110 may be a major surface which is substantially entirely (e.g., all except possibly edge regions) conformally coated with the inorganic optically transparent layer 157 so that the first major surface 167 includes substantially all of the first major surface 112 (e.g., the first major surface 112 of the optical film 100 can be the first major surface 167 of the inorganic optically transparent layer 157). In some embodiments, the first major surface 167 of the inorganic optically transparent layer 157 includes the sidewall portions of the first major surface 112 of the optical film 100.

As described further elsewhere herein, the inorganic optically transparent layer can be used as an etch stop in processes for removing the optically absorptive layer and/or other layers from the optical facets. Suitable materials for the inorganic optically transparent layer include α-Si, SiOx, SiAlOx, SiCyOx, TiO$_2$, and AlOx, for example. The layer can be sufficiently thin that greater than 60%, for example, of normally incident visible light is transmitted through the layer. A layer can be considered optically transparent if the layer has an average optical transmittance (unweighted mean over wavelength for unpolarized light) of visible light (wavelengths in a range of 400 nm to 700 nm) normally incident on the layer in air that is at least 60%. In some embodiments, the average optical transmittance of an inorganic optically transparent layer is greater than 60%, or greater than 70%, or greater than 80%, or greater than 85%, or greater than 90%.

The polymeric layer 110 can include a polymeric structured layer 163 formed on a substrate layer 164 which can be a polymeric substrate. Alternatively, the polymeric layer can refer to the polymeric structured layer 163 which may be formed on a polymeric substrate or on a non-polymeric substrate (e.g., a glass substrate). The polymeric structured layer 163 can be formed on a substrate layer 164 using a cast and cure process, as is known in the art (see, e.g., U.S. Pat. Appl. Pub. No. 2006/0114569 (Capaldo et al.) and U.S. Pat. No. 5,175,030 (Lu et al.) and U.S. Pat. No. 5,183,597 (Lu)). Other methods for making the polymeric structured layer 163 include extrusion, machining, and embossing. Any suitable materials can be used. For example, an acrylate (e.g., polymethylmethacrylate) can be cast and cured onto a polyester (e.g., polyethylene terephthalate) substrate.

In the embodiments illustrated in FIGS. 1 and 4, for example, the polymeric layer 110 has a major surface 113 facing the substrate layer 164. In some embodiments, for each microstructure in at least the majority of the microstructures 115, the sidewall 118 of the microstructure is substantially normal (e.g., within 30 degrees, or 20 degrees, or 10 degrees, or 5 degrees of normal) to a major surface 114 or 113 of the polymeric layer 110 opposite the microstructured surface 168. In some embodiments, for each microstructure in at least the majority of the microstructures 115, the sidewall 118 of the microstructure makes an angle φ with a base 185 of the microstructure, where φ is in a range of 80 degrees to 90 degrees or 85 degrees to 90 degrees, for example. In some embodiments, φ is less than 90 degrees (e.g., 85 to 89.5 degrees) due to manufacturing constraints, for example.

In some embodiments, for each microstructure in at least the majority of the microstructures, the optically absorptive layer 152 has an average thickness t, where 100 nm<t<2 micrometers or 100 nm<t<1 micrometer. In some embodiments, the average thickness t is less than 500 nm. In some embodiments, for each microstructure 115a in at least the majority of the microstructures 115, the sidewall 118 of the microstructure has a height H from a base 185 of an adjacent microstructure 115b to the ridge 119 of the microstructure, where H/t>10, or H/t>12, or H/t>15, or H/t>18, or H/t>20. For example, in some embodiments, 100>H/t>15. In some embodiments, H is less than 1 mm. In some embodiments, H is greater than 100 nm.

Figure 2:
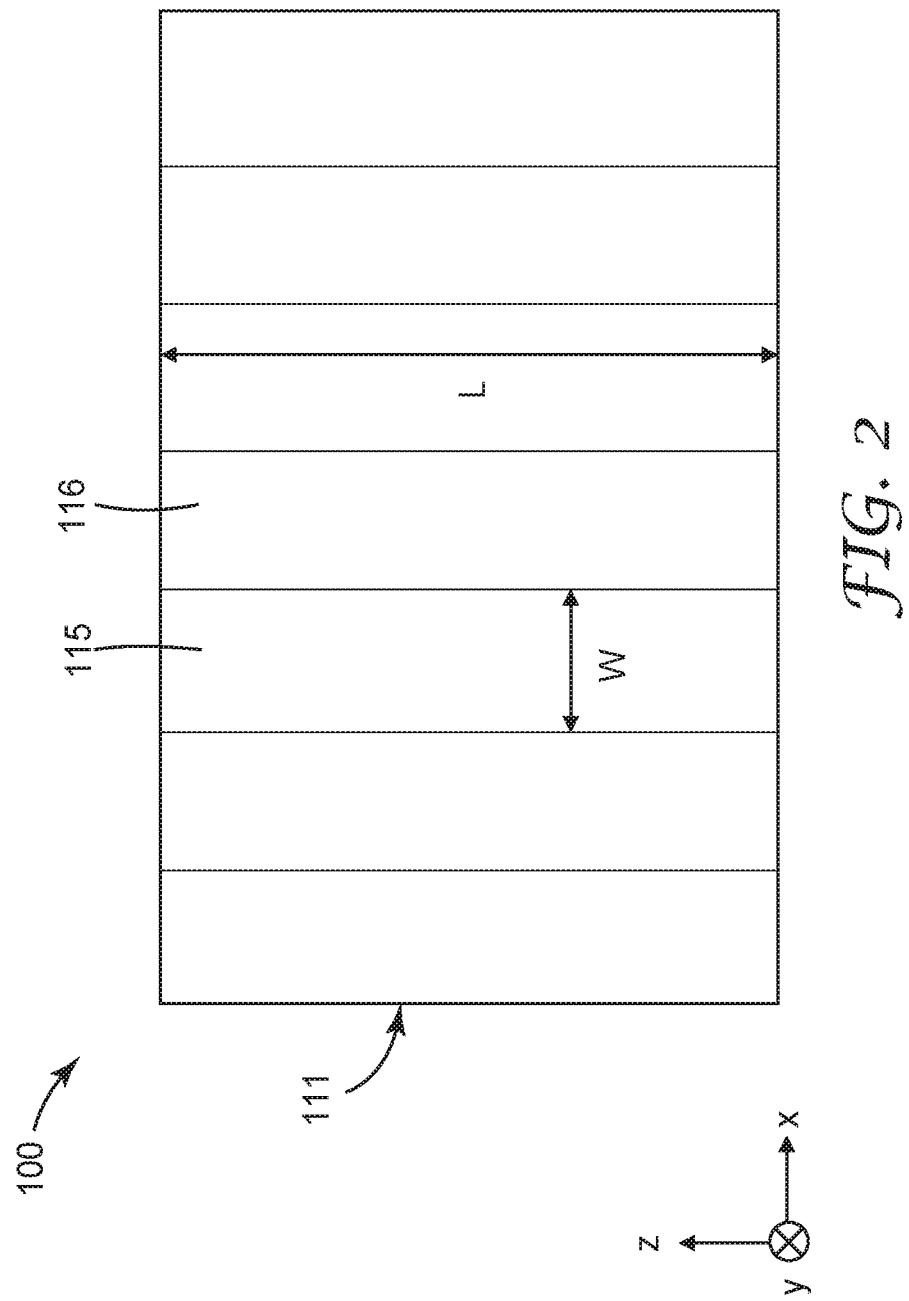
FIG. 2 is a schematic top view of an optical film.

FIG. 2 is a schematic top view of the optical film 100, according to some embodiments. In some embodiments, the plurality of microstructures 115 defines a Fresnel lens 111. Fresnel lenses are known in the art and are described in U.S. Pat. No. 7,701,648 (Amano et al.), for example, and in U.S. Pat. Appl. Pub. Nos. 2010/0302654 (Amano et al.) and 2012/0204566 (Hartzell et al.), for example. The Fresnel lens 111 can have any suitable geometry. In some embodiments, the Fresnel lens 111 includes a plurality of linear Fresnel elements 116 extending longitudinally along a first direction (z-direction). The Fresnel elements 116 can have a varying geometry (e.g., the angle θ can vary from a center of the lens to an edge of the lens) to produce a desired optical effect. In some embodiments, the plurality of microstructures 115 includes a plurality of linear prisms for redirecting light where each prism has a substantially same geometry (e.g., the angle θ can be a same angle for each prism). The microstructures 115 have a width W. In some embodiments, W is less than 1 mm. In some embodiments, W is greater than 100 nm. The width W and/or the height H can be different for different microstructures (e.g., in the case of a Fresnel lens), or the width W and/or the height H can be the same for different microstructures (e.g., in the case of light redirecting prisms). The linear Fresnel elements 116 have a length L along the first direction. In some embodiments, L/W>10 or L/W>100.

Figure 3:
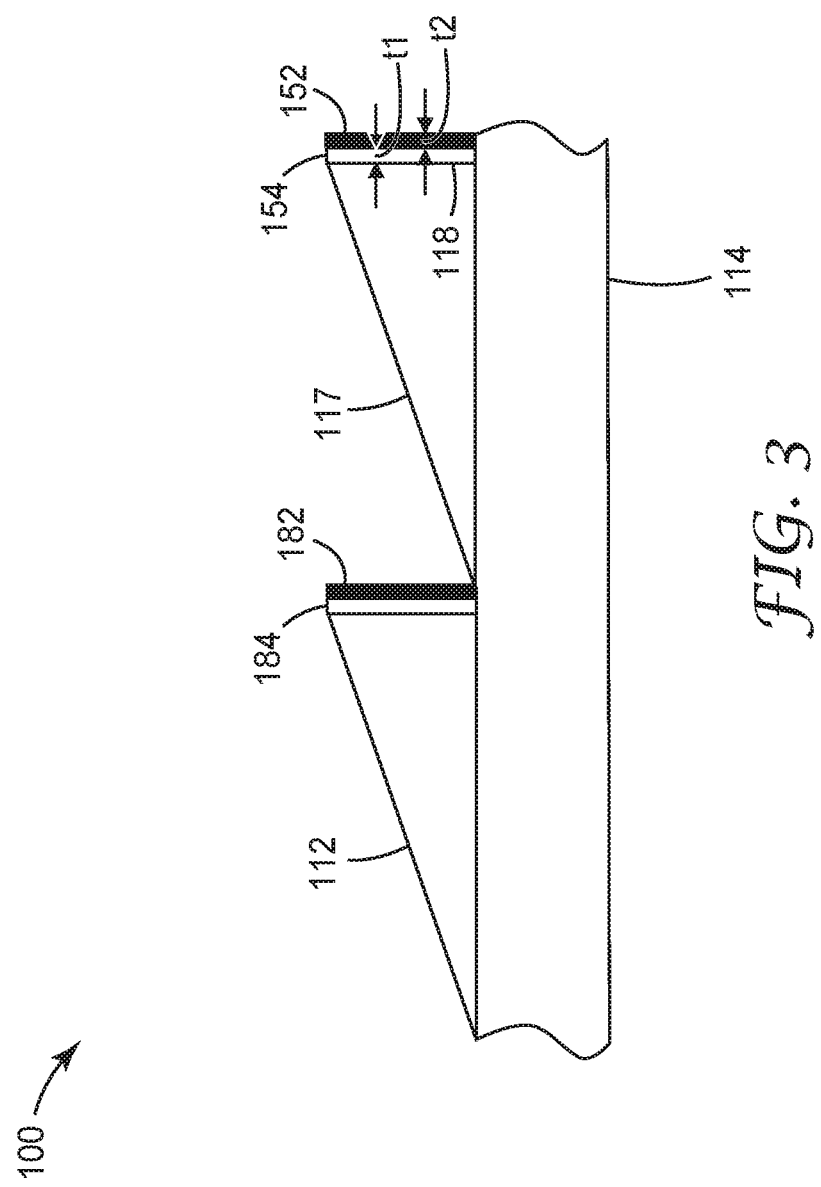
FIGS. 3-8 are schematic cross-sectional views of portions of optical films.

FIG. 3 is a schematic cross-sectional view of a portion of an optical film (e.g., corresponding to optical film 100). In some embodiments, for each microstructure in at least the majority of the microstructures, a first layer 154 is disposed between the sidewall 118 and the optically absorptive layer 152. The first layer 154, which may be referred to as a cladding layer, can be included to reduce reflection of light at an interface between the sidewall and the optically absorptive layer 152. In some embodiments, the first layer 154 has an extinction coefficient k1 and the optically absorptive layer 152 has an extinction coefficient k2. In some embodiments, k2>k1. In some embodiments, the plurality of microstructures has an extinction coefficient k0<0.05. In some embodiments, k2>k1>k0. The extinction coefficient k0 can be understood to be the extinction coefficient of the material at the first major surface 112 defining the microstructure. In some embodiments, k2-k1 is greater than 0.05, 0.1, 0.15, or 0.2. In some embodiments, k2-k1 is less than 1, or less than 0.8, or less than 0.5 In some embodiments, k1-k0 is greater than 0.001, 0.005, or 0.01. In some embodiments, k1-k0 is less than 0.15, or less than 0.1, or less than 0.05. In some embodiments, k0 is less than 0.01, or less than 0.005, or less than 0.002. In some embodiments, k1 is in a range of 0.005 to 0.15, or 0.01 to 0.1. In some embodiments, k2 is in a range of 0.1 to 0.5, or 0.2 to 0.4. In some embodiments, k1<0.5 k2. In some embodiments, 0.005<k1<0.5 k2. Instead of, or in addition to, describing the first layer 154 and the optically absorptive layer 152 in terms of extinction coefficient, the layers can be described in terms of concentration of optically absorptive material as described further elsewhere herein.

In some embodiments, the optically absorptive layer 152 has a refractive index n1 and the first layer 154 has a refractive index n2, where |n1−n2| is less than 0.5, or less than 0.3, or less than 0.2, or less than 0.1.

The extinction coefficient can be expressed as the imaginary part of a complex index of refraction and the refractive index can be expressed as the real part of the complex index of refraction. The extinction coefficient and refractive index can be understood to be evaluated at a wavelength of 550 nm, except where indicated otherwise.

The extinction coefficient, k, of a thin film coating, for example, can be determined via either ellipsometry or spectroscopy, for example. k can be expressed as $\alpha\lambda/(4\pi)$ where $\alpha$ is the absorption coefficient and $\lambda$ is the wavelength. For a thin film coating on a transparent substrate, spectroscopy can be used to measure the absorptance A as 100%−T−R, where T is transmittance and R is reflectance. The measured A can be appropriately corrected for the A of the substrate to obtain A of the thin film itself. The resulting A can then be used to determine $\alpha$ according to the equation $\alpha=-\ln[(100\%-A)/100\%]/h$ where h is the thickness of the thin film coating; this equation for $\alpha$ is an approximation used when R is relatively small, and A is relatively large. The thickness h can be measured, for example, by stylus profilometry or cross-sectional scanning electron microscopy.

The light absorbing material for the optically absorptive layer 152 and/or for the first layer 154 can be one or more of dyes, pigments, or particles (e.g., nanoparticles). Suitable light absorbing materials include carbon black nano-pigments and other nano-pigments such as those available from Cabot Corporation (Boston, MA) under the CAB-O-JET tradename (e.g., carbon black particles available under the tradenames CAB-O-JET 200, 300, or 352K). The carbon black particles can be anionic, surface-modified carbon black particles, for example. Other suitable light absorbing materials include those described in International Pat. Appl. Pub. No. WO 2019/118685 (Schmidt et al.).

In some embodiments, the first layer 154 has a concentration C1 of light absorbing material 184 and the optically absorptive layer 152 has a concentration C2 of light absorbing material 182, where C2>C1. In some embodiments, C1<0.7 C2, or C1<0.5 C2.

The concentration of light absorbing material (e.g., light absorbing nanoparticles) in the optically absorptive layer can be at least 10, 15, 20, 25, 30, 35, 40, 45, or 50 wt. % of the optically absorptive layer. In some embodiments, the concentration of light absorbing material in the optically absorptive layer is at least 55, 60, 65, 70, 75, 80, 85, 90 or 95 wt. % of the optically absorptive layer. In some embodiments, the concentration of light absorbing material in the optically absorptive layer is 100 wt. %. In some embodiments, the concentration of light absorbing material in the optically absorptive layer is 30-100 wt. % or 75-90 wt. % of the optically absorptive layer.

The concentration of light absorbing material in the first layer (cladding layer) is preferably less than the concentration of light absorbing material in the optically absorptive layer. The concentration of light absorbing material in the first layer is typically at least 0.5, 1, 5, 10, 15, 20, 25, 30, 35, 40 or 45 wt. % of the first layer. In some embodiments the concentration of light absorbing material in the first layer is no more than 20, 25, 30, 35, 40, 45, 50, 55, 60, 70, or 75 wt. % of the first layer. In some embodiments, the concentration of light absorbing material in the first layer is 0.5-50 wt. % or 25-45 wt. % of the first layer.

Figure 5:
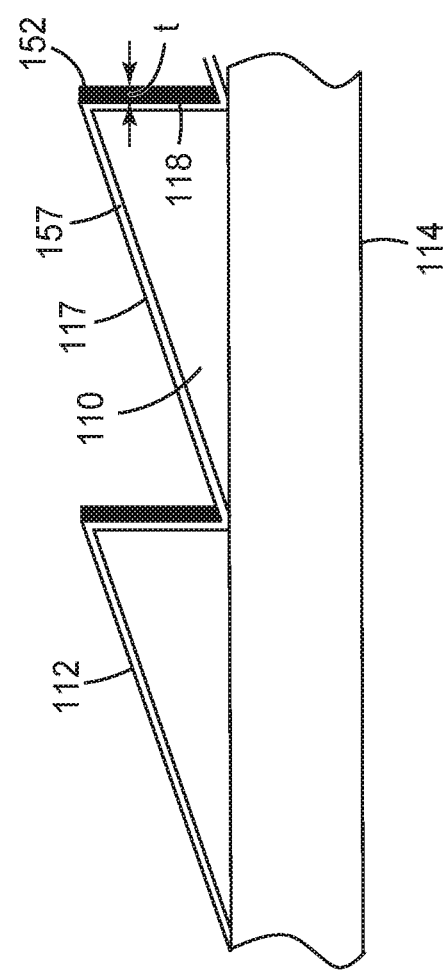
Figure 6:
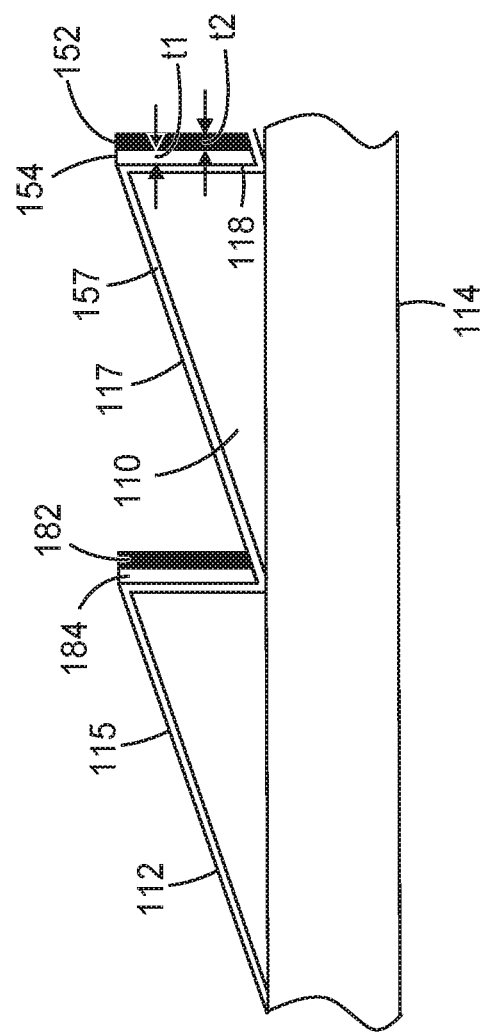
Figure 7:
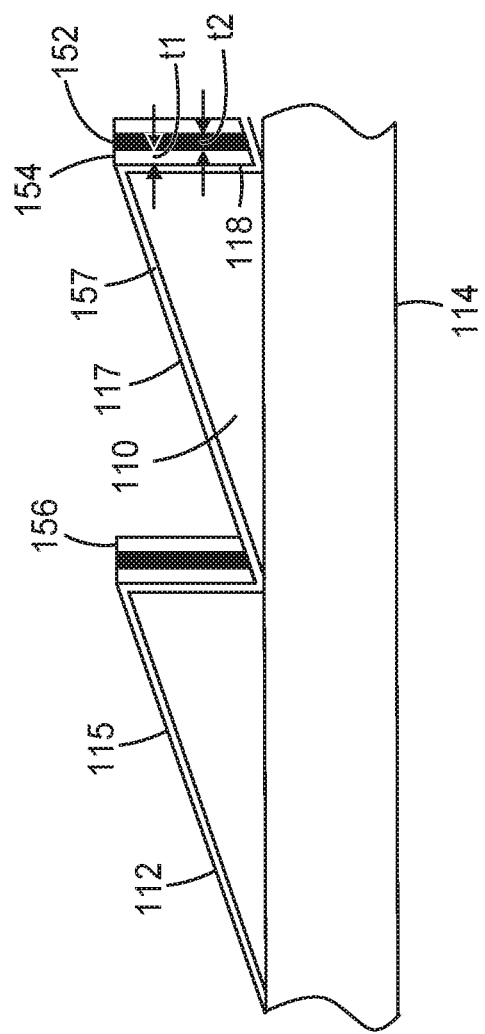

FIGS. 4-8 are schematic cross-sectional views of portions of an optical film (e.g., corresponding to optical film 100). In some embodiments, as schematically illustrated in FIG. 4, for example, the plurality of microstructures 115 includes a microstructured polymeric layer 110 conformally coated with an inorganic optically transparent layer 157. In some embodiments, as schematically illustrated in FIG. 5, for example, for each microstructure in at least a majority of the microstructures 115, an optically absorptive layer 152 is disposed on and substantially covers the inorganic optically transparent layer 157 disposed on the sidewall 118. In some embodiments, as schematically illustrated in FIG. 6, for example, for each microstructure in at least the majority of the microstructures 115, a first layer 154 is disposed between the sidewall 118 and the optically absorptive layer 152. In some embodiments, as schematically illustrated in FIG. 5, for example, the first layer 154 is omitted. In some embodiments, as schematically illustrated in FIG. 7, for example, for each microstructure in at least the majority of the microstructures 115, a second layer 156 is disposed on the optically absorptive layer 152 opposite the sidewall 118 or opposite the first layer 154. The second layer 156 can be a protective layer and/or and antireflective layer, for example. The second layer can be as generally described for the first layer 154 (e.g., having an average thickness and/or extinction coefficient and/or concentration of optically absorptive material in the ranges described for the first layer 154). The inorganic optically transparent layer 157 may be optionally be omitted.

Figure 8:
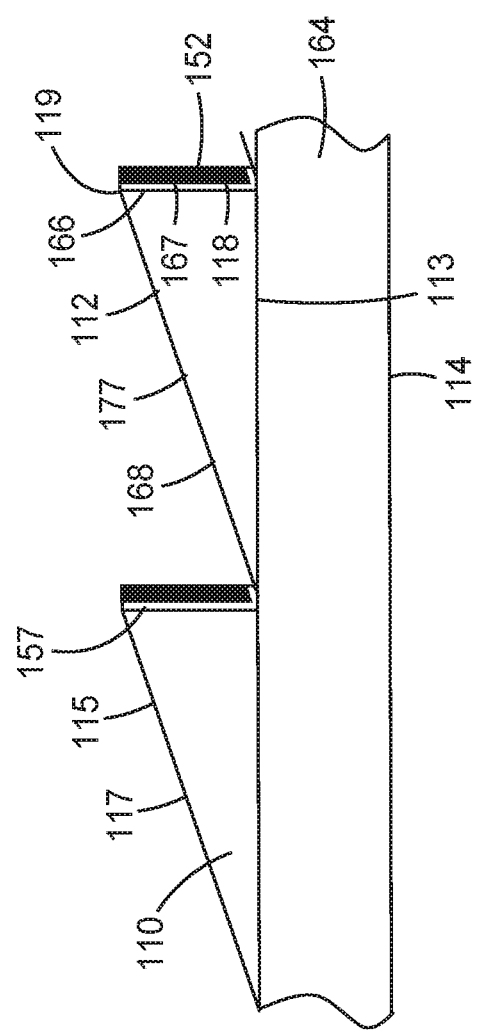

In some embodiments, as schematically illustrated in FIG. 8, for example, the microstructured surface 168 is only partially coated with the inorganic optically transparent layer 157 (e.g., only on the sidewalls). For example, the inorganically optically transparent layer can be conformally coated onto the microstructured surface 168 and then subsequently removed (or at least partially removed) from the optical facets. In any of the embodiments illustrated in FIGS. 4-7, the inorganic optically transparent layer 157 can optionally be removed or partially removed (e.g., a thin layer can remain) from the optical facets, for example. In some embodiments, the first major surface 112 of the optical film can include a major surface of the inorganic optically transparent layer 157 (e.g., the surfaces 167 of the plurality of sidewalls 118). In some embodiments, the microstructures 115 of the at least partially coated microstructured surface can include optical facets that are a portion of the microstructured surface 168 of the polymeric layer 110 and can include sidewalls that are a portion of a major surface of the inorganic optically transparent layer 157. Alternatively, the microstructures 115 can be considered to include optical facets and sidewalls that are portions of the microstructured surface 168 of the polymeric layer 110 and the inorganic optically transparent layer 157 can be considered to be a coating on the sidewall of the polymeric microstructure.

In some embodiments, an optical film includes a polymeric layer 110 including a microstructured surface 168 at least partially coated with an inorganic optically transparent layer 157. The at least partially coated microstructured surface 177 (which can include the optical facets 117 and the surface 167 of the inorganic optically transparent layer 157 on the sidewalls) includes a plurality of microstructures 115. Each microstructure 115 includes an optical facet 117 and a sidewall 118 meeting the optical facet 117 at a ridge 119 of the microstructure 115. The optical facet 117 and the sidewall 118 define an oblique angle therebetween. For each microstructure 115 in at least a majority of the microstructures, an optically absorptive layer 152 is disposed on and substantially covers the sidewall 118.

In some embodiments, an optical film includes a polymeric layer 110 including a major surface 168 including a plurality of microstructures. Each microstructure includes an optical facet (e.g., 117) and a sidewall (e.g., portion of major surface 168 facing the sidewall portion of the inorganic optically transparent layer 157) meeting the optical facet at a ridge of the microstructure. The optical facet and the sidewall define an oblique angle therebetween. For each microstructure in at least a majority of the microstructures: an inorganic optically transparent layer 157 is disposed on and substantially covers the sidewall; and an optically absorptive layer 152 is disposed on the inorganic optically transparent layer 157 opposite the sidewall where the optically absorptive layer 152 substantially covers the inorganic optically transparent layer 157.

In some embodiments, the inorganic optically transparent layer 157 can be provided on the sidewalls along with other layer(s) such as an optically absorptive layer as follows. The inorganically optically transparent layer can be conformally coated onto a microstructured polymeric layer, an optically absorptive layer (and optionally other layers) can be conformally coated onto the inorganic optically transparent layer, the optically absorptive layer (and optionally other layers) can be removed from the optical facets in a first etching step, then the inorganic optically transparent layer can be removed, or partially removed, from the optical facets in a second etching step. The first and second etching steps can utilize different etchants (e.g., an oxygen only plasma for the first etching step and a fluorinated gas or other halogenated gas for the second etching step), for example, in order to remove the desired layer(s) in the corresponding etching step.

In some embodiments, for each microstructure in at least the majority of the microstructures 115, the first layer 154 has an average thickness t1, and the optically absorptive layer 152 has an average thickness t2. In some embodiments, t1 and t2 are each greater than 100 nm and less than 2 micrometers or less than 1 micrometer or less than 500 nm. In some embodiments, t1 and t2 are each less than 500 nm. In some embodiments, for each microstructure in at least the majority of the microstructures 115, the sidewall 118 of the microstructure has a height H from a base of an adjacent microstructure to the ridge 119 of the microstructure. In some embodiments, $H/t1>10$, or $H/t1>12$, or $H/t1>15$, or $H/t1>18$, or $H/t1>20$. In some embodiments, $H/t1<100$. In some embodiments, $H/t2>10$, or $H/t2>12$, or $H/t2>15$, or $H/t2>18$, or $H/t2>20$. In some embodiments, $H/t2<100$. For example, in some embodiments, $H/t1>15$ and $H/t2>15$.

Figure 9:
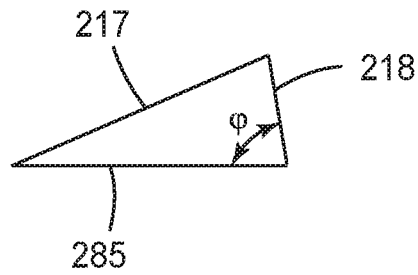
FIGS. 9-11 are schematic cross-sectional views of microstructures.
Figure 10:
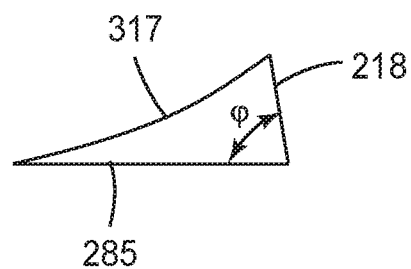
Figure 11:
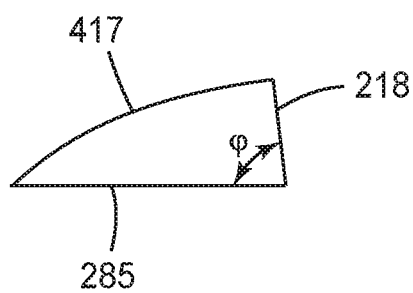

In some embodiments, for each microstructure in at least a majority of the microstructures, the optical facet 117 is planar (e.g., as in typical conventional Fresnel lenses, or in typical conventional light redirecting prisms). FIG. 9 is a schematic illustration of a microstructure with a planar optical facet 217 where the sidewall 218 of the microstructure makes an angle φ with a base 285 of the microstructure. In other embodiments, for each microstructure in at least a majority of the microstructures 115, the optical facet 117 is curved. For example, the facets can be curved to adjust various optical properties as described in U.S. Statutory Invention Registration No. H423 (Mohon et al.), for example. The optical facets 117 may be curved as schematically depicted in FIG. 10 for curved optical facet 317 (concave towards the sidewall 218 and/or towards the base 285 and/or towards the major surface 114 (see, e.g., FIG. 1)) or as schematically depicted in FIG. 11 for curved optical facet 417 (convex towards the sidewall 218 and/or towards the base 285 and/or towards the major surface 114), for example. The angle φ in FIGS. 9-11 may be as described elsewhere (e.g., in a range of 85 to 90 degrees).

Figure 12:
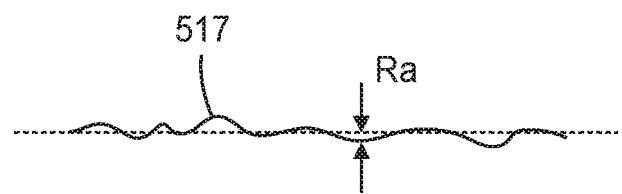
FIG. 12 is a schematic illustration of mean deviation surface roughness.

FIG. 12 is a schematic illustration of a mean deviation surface roughness Ra of a surface 517 which can be a surface of an optical facet. The mean deviation surface roughness Ra is the mean (e.g., mean over a length in a cross-section through the facet (e.g., in a cross-section orthogonal to a length of the facet) or mean over an area of the facet) of the absolute value of the deviation of surface height from a mean surface height. In the case of a curved facet, the deviation in surface height can be defined relative to a mean or nominal curved surface. In some embodiments, for each microstructure in at least a majority of the microstructures 115, the optical facet 117 has a mean deviation surface roughness Ra<250 nm. In some embodiments, Ra is less than 200 nm, 150 nm, 100 nm, 70 nm, 50 nm, 30 nm, or 20 nm. In some embodiments, Ra is greater than 50 nm, 70 nm, 90 nm. For example, in some embodiments, 50 nm<Ra<200 nm or 70 nm<Ra<200 nm. For some applications, it is desired for the optical facet 117 to be optically smooth (e.g., Ra<50 nm). For other applications, some degree of surface roughness may be desired (e.g., 50 nm<Ra<250 nm or 90 nm<Ra<200 nm). For example, it may be useful to have some degree of surface roughness for antireflection, for providing an (e.g., weak) optical diffusion, and/or for improving bonding. It has been found that using the processes described in International Pat. Appl. No. WO 2019/118685 (Schmidt et al.) to deposit and remove an optically absorptive layer from the sloped facets results in a surface roughness that is higher than desired (e.g., Ra greater than 300 nm or greater than 400 nm) for many applications, even though the same process applied to horizontal facets results in low surface roughness. However, it has been found that the surface roughness (e.g., Ra) can be reduced (e.g., to less than 250 nm or to less than 200 nm) by carefully controlling the time that the optical facet is exposed to plasma in a reactive ion etching process, for example. Further, it has been found that applying an inorganic optically transparent layer as an etch stop prior to applying the optically absorptive layer (and/or other layers) can further reduce the surface roughness and can result in optically smooth optical facets (e.g., Ra<50 nm) even with longer etch times. The root-mean-square surface roughness Rq can also be determined and can be in any of the ranges described for Ra.

The surface roughness can be determined from surface profiled measured via atomic force microscopy (AFM), stylus profilometry, or optical profilometry, for example. AFM is typically preferred for small surface roughness (e.g., less than 50 nm).

The inorganic optically transparent layer, the first layer (e.g., cladding layer), the optically absorptive layer, and/or the second layer (e.g., protective layer) can be deposited (e.g., as a conformal coating over an entire structured surface) using any suitable deposition technique. Various coating methods that can be used include, for example, layer-by-layer (LbL) coating, chemical vapor deposition (CVD), sputtering, reactive sputtering, and atomic layer deposition (ALD). At least some of the deposited layers (e.g., all of the layers, or all of the layers except the optional inorganic optically transparent layer) can subsequently be substantially removed from the optical facets (e.g., removed at least to the extent that any material from the at least some of the deposited layers remaining on the optical facets does not significantly affect optical performance).

In some embodiments, at least one of the first layer and the optically absorptive layer includes at least two bi-layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. Some examples of suitable processes include those described in U.S. Pat. No. 8,234,998 (Krogman et al.,) and U.S. Pat. No. 8,313,798 (Nogueira et al.); in U.S. Pat. Appl. Pub. No. 2011/0064936 (Hammond-Cunningham et al.); and in International Pat. Appl. No. WO 2019/118685 (Schmidt et al.). Layer-by layer dip coating can be conducted using a StratoSequence VI (nanoStrata Inc., Tallahassee, FL) dip coating robot, for example.

In some embodiments, the plurality of bi-layers deposited by layer-by-layer self-assembly is a polyelectrolyte stack including an organic polymeric polyion (e.g., cation) and counterion (e.g., anion) including a light absorbing material (e.g., pigment). At least a portion of the cation layers, anion layers, or a combination thereof can include a light absorbing material (e.g., pigment) ionically bonded to the polyelectrolyte. A light absorbing compound can be dispersed within at least a portion of the polyelectrolyte layers. Various polyelectrolytes can be utilized including inorganic compounds, such as silica or silicate, as well as various phosphonocarboxylic acids and salts thereof (some of which are described in U.S. Pat. No. 10,365,415 (Schmidt)).

The thickness of a bi-layer and the number of bi-layers can be selected to achieve the desired optical properties (e.g., light absorption in the case of the optically absorptive layer, or reduced reflection between the sidewall and the optically absorptive layer in the case of the first layer). In some embodiments, the thickness of a bi-layer and/or the number of bi-layers are selected to achieve the desired optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. It should be appreciated that individual bi-layers in the final article may not be distinguishable from each other by common methods in the art such as scanning electron microscopy (SEM) or transmission electron microscopy (TEM). In some embodiments, the thickness of the bi-layers and the total number of bi-layers are selected such that the total thickness of the first layer and the optically absorptive layer is less than 2 micrometers.

After applying and drying the optically absorptive layer and optionally the first and/or second layers and/or the inorganic optically transparent layer to the (e.g., entire) micro structured surface of the film, the optically absorptive layer and the first and second layer, when present, can then be removed from the optical facets and also removed from the land regions, if any, between adjacent microstructures. The inorganic optically transparent layer, which can function as an etch stop, is typically not removed, but can optionally be removed in a subsequent etching step.

Any suitable method can be used to selectively remove layer(s) from the optical facets. In some embodiments, layer(s) are removed by reactive ion etching Reactive ion etching (RIE) is a directional etching process utilizing ion bombardment to remove material. RIE systems are used to remove organic or inorganic material by etching surfaces in the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are typically built around a durable vacuum chamber. Before beginning the etching process, the chamber is typically evacuated to a base pressure lower than 1 Torr, 100 mTorr, 20 mTorr, 10 mTorr, or 1 mTorr. Typically, an electrode holds the materials to be treated and is electrically isolated from the vacuum chamber. The electrode may be a rotatable electrode in a cylindrical shape. A counter electrode is typically also provided within the chamber and may include the vacuum reactor walls. Gas including an etchant typically enters the chamber through a control valve. The process pressure can be maintained by continuously evacuating chamber gases through a vacuum pump. The type of gas used varies depending on the etch process. Etchants can include on or more of oxygen, fluorinated gases, or other halogenated gases, for example. Carbon tetrafluoride ($CF_4$), sulfur hexafluoride ($SF_6$), octafluoropropane ($C_3F_8$), perfluorohexane ($C_6F_{14}$), fluoroform ($CHF_3$), boron trichloride ($BCl_3$), hydrogen bromide (HBr), nitrogen trifluoride ($NF_3$), chlorine, argon, and oxygen are commonly used for etching. Radio frequency (RF) power is applied to the electrode to generate a plasma. Reactive ion etching is known in the art and further described in U.S. Pat. No. 8,460,568 (David et al.) and in International Pat. Appl. No. WO 2019/118685 (Schmidt et al.), for example.

Samples can be conveyed on the electrode through plasma for a controlled time period to achieve a specified etch depth or to limit the etch so that the etch does not penetrate below the layer(s) desired to be removed. For example, if it is desired to remove an optically absorptive layer and the inorganic optically transparent layer is not included, the time period can be adjusted to minimize the time that the optical facets may be exposed to the plasma. This can reduce the surface roughness of the optical facets (e.g., such that Ra<250 nm) as described elsewhere.

In some embodiments, the optically absorptive layer (and/or other layers) are removed by laser ablation, e.g., pulsed laser ablation. Pulsed laser ablation (PLA) is a directional ablation process utilizing a photon flux to generate enough photon fluence to remove material through oxidation and/or sputtering. PLA systems are used to remove organic or inorganic material by etching surfaces in the direction of the photon fluence which can vaporize the target in the generation of a plasma plume. PLA is dependent on the wavelength of the laser, and the amount of absorption present at that wavelength in the light absorbing material. Absorption of the laser pulse generates energy for thermal, chemical, or mechanical evaporation, ablation, and/or plasma formation. The presence of oxidizing gas in the location of the laser pulse may change the amount of chemical oxidation occurring during the PLA process. The fluence can be changed by the optical configuration to change the size and location of the focal spot and by the power setpoints of laser systems. The relative orientation of the laser fluence and the sample can allow one skilled in the art to ablate optically absorptive layers coated on a structured surface at oblique angles.

Figure 13:
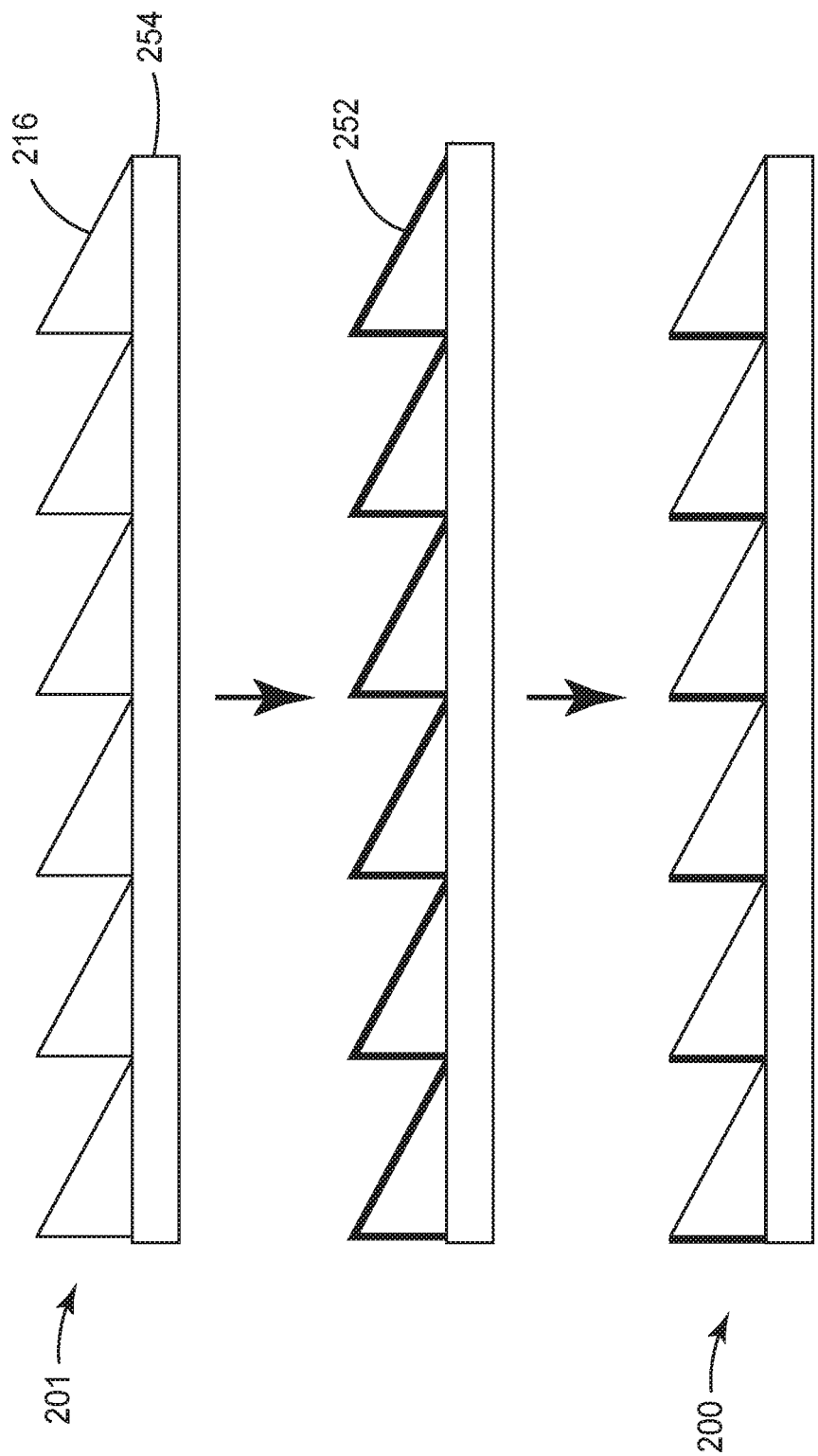
FIG. 13 is a schematic illustration of a process for making an optical film.

FIG. 13 is a schematic illustration of a method of making an optical film 200 (e.g., corresponding to optical film 100). In some embodiments, the method includes providing a structured film 201 including a substrate 264 and a plurality of polymeric microstructures 215 formed on a major surface of the substrate. Each microstructure can include an optical facet and a sidewall meeting the optical facet at a ridge of the microstructure as described further elsewhere herein. The sidewall can be substantially normal to a major surface of the substrate 264 and/or can make an angle with a base of the microstructure in any of the ranges described elsewhere herein. The method can include conformally coating the plurality of polymeric microstructures 215 with an inorganic optically transparent layer 157 (see, e.g., FIG. 4). The method can further include applying a first layer 154 (see, e.g., FIG. 6) to the inorganic optically transparent layer (or to the surface of the polymeric microstructures 215 if the inorganic optically transparent layer is not included), where the first layer has an extinction coefficient greater than an extinction coefficient of the inorganic optically transparent layer or greater than an extinction coefficient of the polymeric microstructures 215. The method includes applying an optically absorptive layer 252 on the first layer or on the inorganic optically transparent layer or the polymeric microstructures 215 if the first layer is omitted. The extinction coefficient of the first layer is preferably less than an extinction coefficient of the optically absorptive layer. The method can include removing at least a portion of the first layer and the optically absorptive layer 252 from the optical facets without removing the inorganic optically transparent layer to provide the optical film 200.

The following is a list of illustrative embodiments of the present description.

A first embodiment is an optical film comprising a polymeric layer comprising a microstructured surface at least partially coated with an inorganic optically transparent layer, the at least partially coated microstructured surface comprising a plurality of microstructures, each microstructure comprising an optical facet and a sidewall meeting the optical facet at a ridge of the microstructure, the optical facet and the sidewall defining an oblique angle therebetween, wherein for each microstructure in at least a majority of the microstructures, an optically absorptive layer is disposed on and substantially covers the sidewall.

A second embodiment is the optical film of the first embodiment, wherein the plurality of microstructures defines a Fresnel lens.

A third embodiment is the optical film of the second embodiment, wherein the Fresnel lens comprises a plurality of linear Fresnel elements extending longitudinally along a first direction.

A fourth embodiment is the optical film of any one of the first through third embodiments, wherein for each microstructure in at least the majority of the microstructures, the optically absorptive layer has an average thickness t, 100 nm<t<1 micrometer.

A fifth embodiment is the optical film of the fourth embodiment, wherein for each microstructure in at least the majority of the microstructures, the sidewall of the microstructure has a height H from a base of an adjacent microstructure to the ridge of the microstructure, H/t>15.

A sixth embodiment is the optical film of any one of the first through fourth embodiments, wherein for each microstructure in at least the majority of the microstructures, a first layer is disposed between the sidewall and the optically absorptive layer.

A seventh embodiment is the optical film of the sixth embodiment, wherein the first layer has a concentration C1 of light absorbing material and the optically absorptive layer has a concentration C2 of light absorbing material, C2>C1.

An eight embodiment is the optical film of any one of the first through seventh embodiments, wherein the microstructured surface of the polymeric layer is conformally coated with the inorganic optically transparent layer.

A ninth embodiment is an optical film comprising opposing first and second major surfaces, the first major surface comprising a plurality of microstructures, each microstructure comprising an optical facet and a sidewall meeting the optical facet at a ridge of the microstructure, the optical facet and the sidewall defining an oblique angle therebetween, wherein for each microstructure in at least a majority of the microstructures:

an optically absorptive layer is disposed on and substantially covers the sidewall, the optically absorptive layer having an average thickness t, 100 nm<t<1 micrometer; and the optical facet has a mean deviation surface roughness Ra<250 nm.

A tenth embodiment is the optical film of the ninth embodiment, wherein Ra<50 nm.

An eleventh embodiment is the optical film of the ninth embodiment, wherein 50 nm<Ra<200 nm.

A twelfth embodiment is an optical film comprising opposing first and second major surfaces, the first major surface comprising a plurality of microstructures having an extinction coefficient k0<0.05, each microstructure comprising an optical facet and a sidewall meeting the optical facet at a ridge of the microstructure, the optical facet and the sidewall defining an oblique angle therebetween, wherein for each microstructure in at least a majority of the microstructures:

a first layer is disposed on and substantially covers the sidewall, the first layer having an extinction coefficient k1, wherein k1>k0; and an optically absorptive layer is disposed on the first layer opposite the sidewall, the optically absorptive layer substantially covering the first layer and having an extinction coefficient k2, wherein k2−k1>0.05.

A thirteenth embodiment is the optical film of the twelfth embodiment, wherein for each microstructure in at least the majority of the microstructures, the sidewall of the microstructure has a height H from a base of an adjacent microstructure to the ridge of the microstructure, the first layer has an average thickness t1, and the optically absorptive layer has an average thickness t2, wherein H/t1>15 and H/t2>15.

A fourteenth embodiment is the optical film of the twelfth or thirteenth embodiments, wherein for each microstructure in at least the majority of the microstructures, the first layer has an average thickness t1, and the optically absorptive layer has an average thickness t2, wherein t1 and t2 are each greater than 100 nm and less than 1 micrometer.

A fifteenth embodiment is the optical film of any one of the twelfth through fourteenth embodiments further comprising a polymeric layer comprising a microstructured surface conformally coated with an inorganic optically transparent layer, the inorganic optically transparent layer comprising at least a majority of the first major surface of the optical film.

EXAMPLES

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri.

The following tables provide lists of materials used throughout the Examples, as well as their brief descriptions and origins. The components of Resin A used in the cast-and-cure microreplication process are listed in Table 1. The raw materials for deposition of the transparent inorganic layer and reactive ion etching are listed in Table 2. The raw materials for the layer-by-layer coating are listed in Table 3.

TABLE 1

Raw materials for Resin A

| Material | Abbreviation | Source |
| --- | --- | --- |
| PHOTOMER 6210 aliphatic urethane acrylate oligomer | PHOTOMER 6210 | Cognis (Monheim, Germany) |
| 1,6-hexanediol diacrylate | HDDA | Sigma-Aldrich Co. (St. Louis, Missouri) |
| Trimethylolpropane triacrylate | TMPTA | Cytec Industries (Woodland Park, NJ) |
| Diphenyl(2,4,6-trimethylbenzoyl)phosphine oxide photoinitiator | TPO | BASF Corporation (Florham Park, New Jersey) |

TABLE 2

Raw materials for deposition of transparent inorganic layer and reactive ion etching

| Material | Abbreviation | Source |
| --- | --- | --- |
| Hexamethyldisiloxane | HMDSO | Gelest Inc (Morrisville, PA) |
| Oxygen (UHP compressed gas) | $O_2$ | Oxygen Service Company (St Paul, Minnesota) |

TABLE 3

Raw materials for the layer-by-layer coatings

| Material | Abbreviation | Source |
| --- | --- | --- |
| SANCURE 20072 cationic polyurethane dispersion | SC72 | Lubrizol (Wickliffe, Ohio) |
| CARBOSET CR-3090 anionic acrylic latex emulsion | CR3090 | Lubrizol (Wickliffe, Ohio) |
| Anionic, surface-modified carbon black | CB | Cabot Corporation (Boston, Massachusetts) |
| Sodium chloride | NaCl | Sigma-Aldrich Co. (St. Louis, Missouri) |
| PLURONIC L92 | PL92 | BASF Corporation (Florham Park, New Jersey) |

Method for Fabricating Microstructured Film (Linear Fresnel Lens)

A diamond turning process that was used to fabricate linear Fresnel structures on cylindrical metal tool. Using the tool, a Continuous Cast and Cure (3C) process was used to microreplicate Fresnel prisms on a substrate with an ultraviolet (UV) curable 100% solid resin. Details of the 3C process are described in U.S. Pat. No. 5,175,030 (Lu et al.), U.S. Pat. No. 5,183,597 (Lu), and U.S. Pat. No. 9,919,330 (Johnson et al.), for example.

Method for Deposition of Transparent Inorganic Layer

A silicon containing film layer was applied to the microstructured film as generally described in U.S. Pat. No. 6,696,157 (David et al.) and U.S. Pat. No. 8,664,323 (Iyer et al.) and U.S. Pat. Appl. Pub. No. 2013/0229378 (Iyer et al.) using a home-built parallel plate capacitively coupled plasma reactor. The chamber had a central cylindrical powered electrode with a surface area of 18.3 $ft^2$. After placing the micro-structured film on the powered electrode, the reactor chamber was pumped down to a base pressure of less than 1.3 Pa (2 mTorr). A mixture of HMDSO (hexamethyldisiloxane) and $O_2$ (oxygen) gas was flowed into the chamber, at rates of 100 SCCM and 1000 SCCM respectively. Treatment was carried out using a plasma enhanced CVD (PECVD) method by coupling RF power into the reactor at a frequency of 13.56 MHz and an applied power of 7500 watts. Treatment time was controlled by moving the microstructured film through the reaction zone at rate of 2 ft/min, resulting in an approximate exposure time of 150 seconds. After completing the deposition, RF power was turned off and gasses were evacuated from the reactor. Additional information regarding materials and processes for applying cylindrical PECVD and further details around the reactor used can be found in U.S. Pat. No. 8,460,568 (David et al.).

Method for Depositing Layer-by-Layer Coating on Microstructured Film

Layer-by-layer coatings were made using an apparatus purchased from Svaya Nanotechnologies, Inc. (Sunnyvale, CA) and modeled after the system described in U.S. Pat. No. 8,234,998 (Krogman et al.) as well as Krogman et al. "Automated Process for Improved Uniformity and Versatility of Layer-by-Layer Deposition", *Langmuir* 2007, 23, 3137-3141.

The apparatus included pressure vessels loaded with the coating solutions. Spray nozzles with a flat spray pattern (from Spraying Systems, Inc., Wheaton, IL) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated was adhered at the edges with epoxy (Scotch-Weld epoxy adhesive, DP100 Clear, 3M Company, St. Paul, MN) to a glass plate (12"×12"×⅛" thick) (Brin Northwestern Glass Co., Minneapolis, MN), which was mounted on a vertical translation stage and held in place with a vacuum chuck. In a typical coating sequence, the polycation (e.g., SANCURE 20072)-containing solution was sprayed onto the substrate while the stage moved vertically downward at 76 mm/sec. Next, after a dwell time of 12 sec, the DI water solution was sprayed onto the substrate while the stage moved vertically upward at 102 mm/sec. The substrate was then dried with an airknife at a speed of 3 mm/sec. Next, the polyanion (e.g., surface-modified carbon black)-containing solution was sprayed onto the substrate while the stage moved vertically downward at 76 mm/sec. Another dwell period of 12 sec was allowed to elapse. The DI water solution was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion)$_n$ where n is the number of bi-layers. The coated substrate (e.g., polymer film) was peeled off the glass prior to subsequent processing.

Method for Reactive Ion Etching

Following the layer-by-layer coating reactive ion etching was carried out in the same home-built reactor chamber used to deposit the etch stop layer. After placing the coated micro-structured film on the powered electrode, the reactor chamber was pumped down to a base pressure of less than 1.3 Pa (2 mTorr). $O_2$ gas was flowed into the chamber at a rate of 1000 SCCM. 13.56 MHz RF power was subsequently coupled into the reactor with an applied power. The film was then carried through the reaction zone at a controlled rate, to achieve an exposure time, which removes the coating on horizontal and oblique angled surfaces. At the end of this treatment time, the RF power and the gas supply were stopped, and the chamber was returned to atmospheric pressure.

Preparative Example 1 (PE1): Fabrication of Microstructured Film (Linear Fresnel Lens)

Primed 3 mil PET and a UV curable resin (Resin A) were used with 3C process to produce linear Fresnel prism for PE1. The formulation of Resin A is provided in Table 4.

TABLE 4

| Formulation for Resin A | |
|---|---|
| Abbreviation | Parts by weight |
| PHOTOMER 6210 | 60 |
| HDDA | 20 |
| TMPTA | 20 |
| TPO | 0.5 |

Preparative Example 2 (PE2): Preparation of Polycationic-Containing Coating Solution ("Cation")

SC72 was diluted from 27.1 wt % solids to a concentration of 1.0 wt % solids with deionized (DI) water. NaCl was added to a concentration of 0.05 M. PL92 surfactant was added to a concentration of 0.1 wt %.

Preparative Example 3 (PE3): Preparation of Polyanion-Containing Coating Solution for Optical Absorbing Layer ("Anion1")

CB was diluted from 30.5 wt % solids to a concentration of 1.0 wt % solids with deionized (DI) water. NaCl was added to a concentration of 0.05 M. PL92 surfactant was added to a concentration of 0.1 wt %.

Preparative Example 4 (PE4): Preparation of Polyanionic-Containing Coating Solution for Cladding Layers ("Anion2")

CR3090 was diluted from 45.6 wt % solids to a concentration of 2.0 wt % solids with deionized (DI) water. CB was added to a concentration of 0.25 wt % solids. NaCl was added to a concentration of 0.05 M. PL92 surfactant was added to a concentration of 0.1 wt %.

Example 1 (No Transparent Inorganic Layer ("Etch Stop"))

Figure 14:
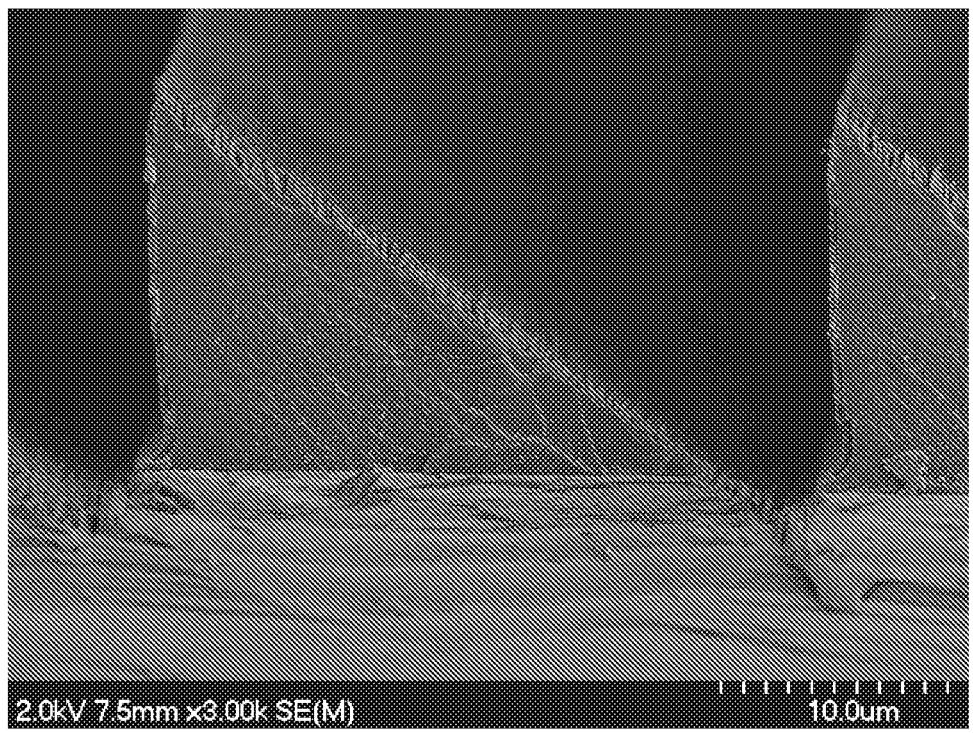
FIGS. 14-15 are images of microstructures.

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. Cationic and anionic coating solutions were made as described in PE2 and PE3, respectively. The corona-treated film was coated with (SC72/CB)$_6$ ("6 bilayers") using the "Method for Depositing Layer-by-Layer Coating on Microstructured Film". This coated film was subjected to reactive ion etching (RIE) using the "Method for Reactive Ion Etching" at an applied power of 9000 W for a duration of 260 seconds. An equivalent layer-by-layer coating deposited onto a glass plate had a thickness of 337 nm as measured with a DEKTAK XT stylus profilometer (Bruker Nano, Inc., Tucson, AZ) after scoring the coating with a razor blade. The surface roughness Ra and Rq were measured for the optical facets using a Keyence VK-X200 confocal microscope. The resulting Ra was 0.141 micrometers and the resulting Rq was 0.197 micrometers. FIG. 14 is a scanning electron microscope (SEM) image of a microstructure of Example 1.

Example 2 (with Transparent Inorganic Layer ("Etch Stop"), Optically Absorbing Layer with No Cladding Layers)

A sheet of microstructured film as made in PE1 was cut to a size of 9"×10". A transparent inorganic layer was deposited using the "Method for Deposition of Transparent Inorganic Layer". Cationic and anionic coating solutions were made as described in PE2 and PE3, respectively. Next, the film was coated with $(SC72/CB)_{10}$ ("10 bilayers") using the "Method for Depositing Layer-by-Layer Coating on Microstructured Film". This coated film was subjected to reactive ion etching (RIE) using the "Method for Reactive Ion Etching" at an applied power of 7500 W for a duration of 360 s. An equivalent layer-by-layer coating deposited onto a glass plate had a thickness of 614 nm as measured with a DEKTAK XT stylus profilometer (Bruker Nano, Inc., Tucson, AZ) after scoring the coating with a razor blade. The surface roughness Ra and Rq were measured for the optical facets using a Keyence VK-X200 confocal microscope. The resulting Ra was 0.017 micrometers and the resulting Rq was 0.021 micrometers.

Figure 15:
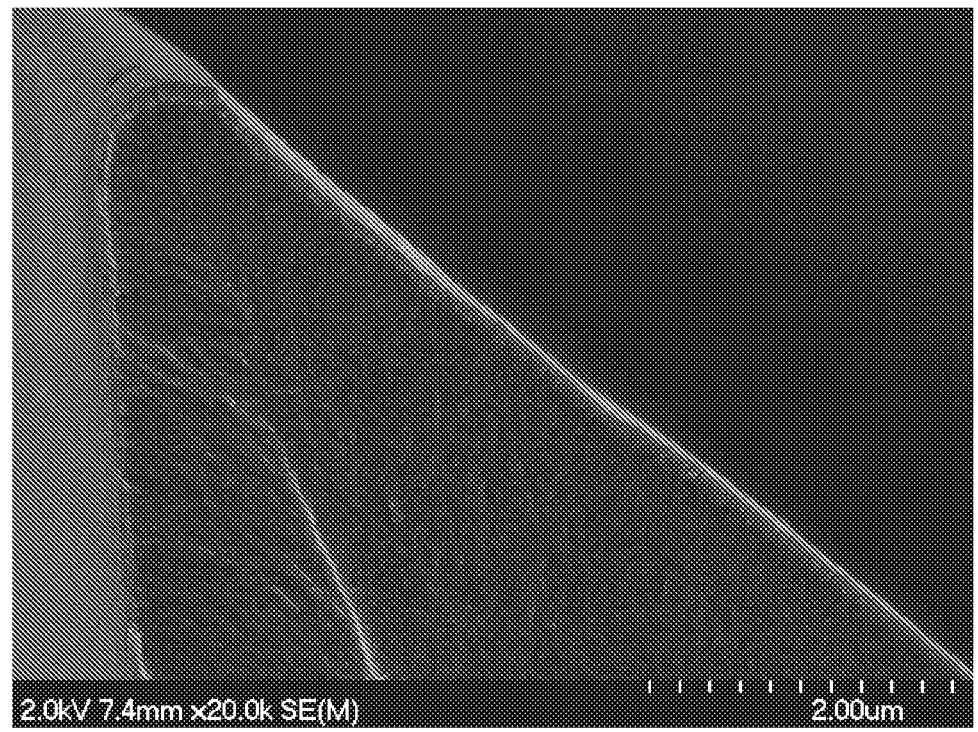

The sample of Example 2 appeared optically clear while the sample of Example 1 appeared hazy from all angles. FIG. 15 is an SEM image of a microstructure of Example 2.

Example 3 (with Transparent Inorganic Layer ("Etch Stop"), Optically Absorbing Layer with Cladding Layers)

A sheet of microstructured film as made in PE1 was cut to a size of 9"×10". A transparent inorganic layer was deposited using the "Method for Deposition of Transparent Inorganic Layer". Cationic coating solution, anionic coating solution for the optically absorbing layer (i.e., "core"), and anionic coating solution for the cladding layers were made as described in PE2, PE3, and PE4, respectively. Next, the film was coated with $(SC72/CR3090+CB)_6(SC72/CB)_6(SC72/CR3090+CB)_8$ ("20 bilayers") using the "Method for Depositing Layer-by-Layer Coating on Microstructured Film". The inner cladding layer (contacting the transparent inorganic layer) was formed from 6 bilayers of SC72/CR3090+CB. The optically absorptive layer was formed from 6 bilayers of SC72 and CB. The outer cladding layer was formed from 8 bilayers of SC72/CR3090+CB. This coated film was subjected to reactive ion etching (RIE) using the "Method for Reactive Ion Etching" at an applied power of 7500 W for a duration of 360 s. An equivalent layer-by-layer coating deposited onto a glass plate had a thickness of 1018 nm as measured with a DEKTAK XT stylus profilometer (Bruker Nano, Inc., Tucson, AZ) after scoring the coating with a razor blade.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising a polymeric layer comprising a microstructured surface conformally coated with an inorganic optically transparent layer, the conformally coated microstructured surface comprising a plurality of microstructures, each microstructure comprising an optical facet and a sidewall meeting the optical facet at a ridge of the microstructure, the optical facet and the sidewall defining an oblique angle therebetween, wherein for each microstructure in at least a majority of the microstructures:
   an optically absorptive layer is disposed on and substantially covers the sidewall, the optically absorptive layer comprising a first polyelectrolyte; and
   the optical facet has a mean deviation surface roughness Ra<50 nm.

2. The optical film of claim 1, wherein the optically absorptive layer comprises a second polyelectrolyte, the first and second polyelectrolytes having opposite charges.

3. The optical film of claim 1, wherein the optically absorptive layer comprises a light absorbing material ionically bonded to the first polyelectrolyte.

4. The optical film of claim 1, wherein the plurality of microstructures defines a Fresnel lens.

5. The optical film of claim 4, wherein the Fresnel lens comprises a plurality of linear Fresnel elements extending longitudinally along a first direction.

6. The optical film of claim 1, wherein for each microstructure in at least the majority of the microstructures, the optically absorptive layer has an average thickness t, 100 nm<t<1 micrometer.

7. The optical film of claim 6, wherein for each microstructure in at least the majority of the microstructures, the sidewall of the microstructure has a height H from a base of an adjacent microstructure to the ridge of the microstructure, H/t>15.

8. The optical film of claim 1, wherein for each microstructure in at least the majority of the microstructures, a first layer is disposed between the sidewall and the optically absorptive layer.

9. The optical film of claim 8, wherein the first layer has a concentration C1 of light absorbing material and the optically absorptive layer has a concentration C2 of light absorbing material, C2>C1.

10. The optical film of claim 1, wherein the plurality of microstructures has an extinction coefficient k0<0.05, and wherein for each microstructure in at least a majority of the microstructures:
   a first layer is disposed between the sidewall and the optically absorptive layer, the first layer having an extinction coefficient k1, wherein k1>k0; and
   the optically absorptive layer has an extinction coefficient k2, wherein k2−k1>0.05.

11. The optical film of claim 1, wherein the inorganic optically transparent layer is a monolithic layer directly contacting the microstructured surface of the polymeric layer and comprising an outermost major surface of the optical film.

\* \* \* \* \*